United States Patent
Jung et al.

(10) Patent No.: US 10,002,432 B2
(45) Date of Patent: Jun. 19, 2018

(54) METHOD AND APPARATUS FOR RENDERING TARGET FLUID

(71) Applicant: SAMSUNG ELECTRONICS CO., LTD, Suwon-si (KR)

(72) Inventors: Hwiryong Jung, Seoul (KR); Nahyup Kang, Seoul (KR); Jiyeon Kim, Hwaseong-si (KR); Donghoon Sagong, Suwon-si (KR); Hyong Euk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 15/246,822

(22) Filed: Aug. 25, 2016

(65) Prior Publication Data
US 2017/0124431 A1    May 4, 2017

(30) Foreign Application Priority Data
Nov. 4, 2015    (KR) .................. 10-2015-0154230

(51) Int. Cl.
 *G06K 9/00* (2006.01)
 *G06T 7/00* (2017.01)
 (Continued)

(52) U.S. Cl.
 CPC .......... *G06T 7/0051* (2013.01); *G06T 7/602* (2013.01); *G06T 17/00* (2013.01); *G06T 2210/24* (2013.01); *G06T 2210/56* (2013.01)

(58) Field of Classification Search
 CPC . G06T 17/00; G06T 2210/24; G06T 2210/56; G06T 7/0051; G06T 7/602
 See application file for complete search history.

(56) References Cited

U.S. PATENT DOCUMENTS 7,917,343 B2 *   3/2011   Kim ................. G06T 13/60
                                                 703/12
8,289,327 B1 *  10/2012   Horvath ............ G06T 13/60
                                                 345/428
(Continued)

FOREIGN PATENT DOCUMENTS

| CN | 103679802 A | 3/2014 |
| KR | 10-2008-0050970 A | 6/2008 |
| KR | 10-2012-0100419 A | 9/2012 |

OTHER PUBLICATIONS

Horvath, C., et al., "Mass preserving multi-scale SPH," Pixar Technical Memo, vol. 13-04, Pixar Animation Studios, 2013 (8 pages).

(Continued)

*Primary Examiner* — Bhavesh Mehta
*Assistant Examiner* — Ian Lemieux
(74) *Attorney, Agent, or Firm* — NSIP Law

(57) ABSTRACT

Provided is a method and apparatus for rendering a target fluid that include defining level-set information of fluid particles configuring a modeled target fluid. The level-set information comprises a shortest distance from a surface of the target fluid to the fluid particles. The method and apparatus are include discarding internal particles of the target fluid from the modeled target fluid based on the level-set information of the fluid particles, and calculating thickness information of the target fluid, from which the internal particles are discarded, based on depth information on the fluid particles. The target fluid is rendered based on the thickness information of the target fluid.

25 Claims, 16 Drawing Sheets

(51) Int. Cl.
*G06T 7/60* (2017.01)
*G06T 17/00* (2006.01)

(56) References Cited

U.S. PATENT DOCUMENTS

| | | |
|---|---|---|
| 8,947,430 B1 | 2/2015 | Green et al. |
| 2008/0319722 A1 | 12/2008 | Anderson |
| 2009/0112526 A1* | 4/2009 | Kim ............... G06T 13/60 703/1 |
| 2016/0063140 A1* | 3/2016 | Kang ............... G06F 17/10 703/1 |

OTHER PUBLICATIONS

Kim, D., et al., Interactive Fluid Simulation Method for Mobile Device, The HCI Society of Korea, 2009 (7 pages).
Kim, S., et al., "Parallel Processing of Multi-Core Processor and GPUs in Projection Step for Efficient Fluid Simulation," The Journal of the Korea Contents Association, vol. 13.6, 2013 (pp. 48-54).
Losasso, F., et al. "Two-way coupled SPH and particle level set fluid simulation," IEEE Transactions on Visualization and Computer Graphics, vol. 14.4, 2008 (7 pages).
Sethian, J. et al., "Level set methods for fluid interfaces," Annual Review of Fluid Mechanics, vol. 35.1, 2003 (38 pages).
Stanton, M. et al., "Self-Refining Games using Player Analytics," ACM Transactions on Graphics, vol. 33, No. 4, Jul. 2014 (9 pages).
Van der Laan, W. et al., "Screen space fluid rendering with curvature flow," Proceedings of the 2009 symposium on Interactive 3D graphics and games, ACM, 2009 (20 pages).

\* cited by examiner

Discard internal particles

Memory usage amount reduction

Based on camera movement

Store surface particles

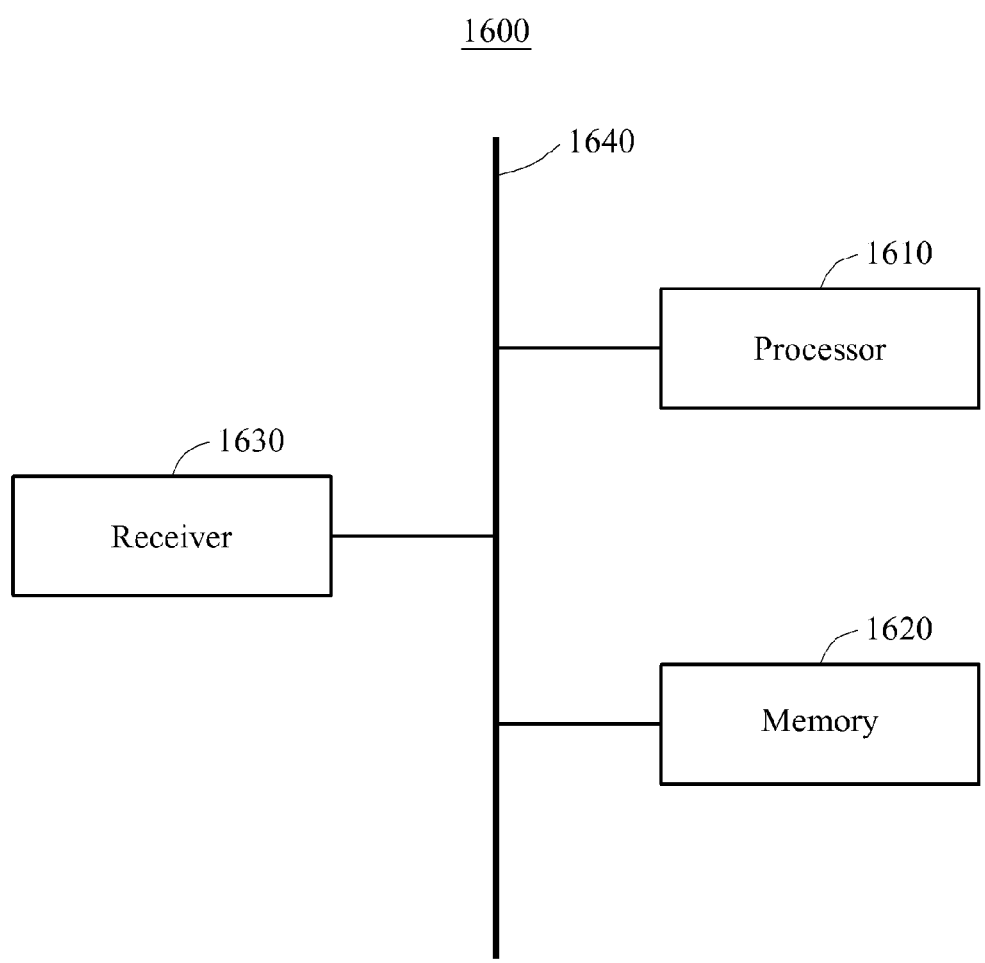

METHOD AND APPARATUS FOR RENDERING TARGET FLUID

CROSS-REFERENCE TO RELATED APPLICATION(S)

This application claims the benefit under 35 USC 119(a) of Korean Patent Application No. 10-2015-0154230, filed on Nov. 4, 2015, in the Korean Intellectual Property Office, the entire disclosure of which is incorporated herein by reference for all purposes.

BACKGROUND

1. Field

The following description relates to a rendering method and apparatus of a target fluid.

2. Description of Related Art

A pre-computation method of modeling a fluid stores a modeling result of each frame of the fluid and generates a movement of the fluid in response to the stored result during an actual application execution.

Based on the movement of the fluid, the pre-computation method pre-stores a large volume of modeling result values and performs real-time modeling. Thus, a rendering method and corresponding apparatus are desired that can render a fluid, while reducing a volume of modeling result values to be stored.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a method of rendering a target fluid, including: defining level-set information of fluid particles configuring a modeled target fluid, wherein the level-set information may also include a shortest distance from a surface of the target fluid to the fluid particles; discarding internal particles of the target fluid from the modeled target fluid based on the level-set information of the fluid particles; calculating thickness information of the target fluid, from which the internal particles are discarded, based on depth information on the fluid particles; and rendering the target fluid based on the thickness information of the target fluid.

The method may also include: receiving an input value associated with a thickness of a fluid from a user, wherein the discarding of the internal particles of the target fluid may also include discarding the internal particles of the target fluid based a comparison between the input value and the level-set information.

The discarding of the internal particles of the target fluid may also include: discarding, from the modeled target fluid, fluid particles corresponding to the level-set information greater than the input value.

The calculating of the thickness information of the target fluid may also include: calculating, at a point in time corresponding to a scene, the thickness information of the target fluid based on depth information on surface particles configuring the target fluid.

The calculating of the thickness information of the target fluid may also include: sorting the fluid particles in an order of the depth information based on position information of the fluid particles; configuring a particle pair using the sorted fluid particles; and generating a thickness map indicating a thickness of the target fluid, from which the internal particles are discarded, based on thickness information of fluid particles configuring the particle pair.

The sorting of the fluid particles may also include: calculating the depth information from a virtual camera based on the position information of the fluid particles; sorting the fluid particles based on the depth information; and generating a sorting table based on the depth information corresponding to the sorted fluid particles.

The method may also include: receiving at least one of the position information of the fluid particles, information on neighbor particles of the fluid particles, and the level-set information of the fluid particles.

The method may also include: grouping the fluid particles based on particle information of the fluid particles.

The grouping of the fluid particles may also include: grouping the fluid particles based on distances between the fluid particles and neighbor particles of the fluid particles; and assigning group information based on the grouping to the grouped fluid particles.

The grouping of the fluid particles may also include: calculating the distances between the fluid particles and the neighbor particles from information on the neighbor particles of the fluid particles comprised in the particle information; and grouping the fluid particles based on the distances between the fluid particles and the neighbor particles.

The calculating of the thickness information of the target fluid from which the internal particles are discarded may also include: sorting the fluid particles in an order of the depth information based on position information of the fluid particles; and calculating the thickness information of the target fluid from which the internal particles are discarded based on group information corresponding to the sorted fluid particles.

The sorting of the fluid particles may also include: calculating the depth information from a virtual camera based on the position information of the fluid particles; sorting the fluid particles based on the depth information; and generating a sorting table based on the depth information corresponding to the sorted fluid particles and the group information of the fluid particles corresponding to the depth information.

The calculating of the thickness information of the target fluid may also include: configuring a particle pair using the sorted fluid particles; and generating a thickness map indicating a thickness of the target fluid based on whether fluid particles configuring the particle pair are comprised in a same group.

The generating of the thickness map may also include at least one of, adding a depth difference among fluid particles configuring the particle pair to the thickness map in response to the fluid particles configuring the particle pair in the same group; adding a thickness of a particle to the thickness map in response to the fluid particles configuring the particle pair excluded from the same group; and discarding any one fluid particle not comprised in the same group from the particle pair in response to the fluid particles configuring the particle pair excluded from the same group.

In accordance with a further embodiment, there is provided a computer program embodied on a non-transitory computer readable medium, the computer program being configured to control a processor to perform the method described above.

In accordance with another embodiment, there is provided an apparatus for rendering a target fluid, including: a memory configured to store at least one of position information of fluid particles, information on neighbor particles of the fluid particles, and level-set information of the fluid particles, wherein the level-set information may also include a shortest distance from a surface of a target fluid to the fluid particles; and a processor configured to define the level-set information of the fluid particles configuring a modeled target fluid, discard internal particles of the target fluid from the modeled target fluid based on the level-set information of the fluid particles, and render the target fluid based on thickness information of the target fluid, wherein the internal particles are calculated based on depth information on the fluid particles.

The apparatus may also include: a receiver configured to receive an input value associated with a thickness of a fluid from a user, wherein the processor may be configured to discard, from the target fluid, fluid particles corresponding to level-set information greater than the input value based on a comparison between the input value and the level-set information.

The processor may be configured to sort the fluid particles in an order of the depth information based on the position information of the fluid particles, configure a particle pair using the sorted fluid particles, and generate a thickness map indicating a thickness of the target fluid from which the internal particles are discarded based on thickness information of fluid particles configuring the particle pair.

The processor may be configured to group the fluid particles based on distances between the fluid particles and neighbor particles of the fluid particles, and assign group information based on the grouping to the grouped fluid particles.

The processor may be configured to sort the fluid particles in an order of the depth information based on the position information of the fluid particles, configure a particle pair using the sorted fluid particles, and generate a thickness map indicating a thickness of the target fluid based on whether fluid particles configuring the particle pair are in a same group.

In accordance with an embodiment, there is provided a method of a target fluid, including: calculating depth information from a virtual camera based on position information of fluid particles; sorting the fluid particles in an order of the depth information based on the position information of the fluid particles; configuring a particle pair using the sorted fluid particles; discarding, from the particle pair, a fluid particle outside from a same group of the fluid particles; adding to a thickness map a depth difference of the fluid particles in the particle pair in response to the particle pair being included in the same group; and storing the thickness map indicating a thickness of the target fluid from which the fluid particle has been discarded.

The method may also include: generating a sorting table based on the depth information and group information of the fluid particles corresponding to the depth information.

The method may also include: determining level-set information of the fluid particles and information on neighbor particles of the fluid particles, wherein the level-set information may also include a shortest distance from a surface of the target fluid to the fluid particles; and grouping the fluid particles based on distances between the fluid particles and the neighbor particles.

The method may also include: maintaining the fluid particles corresponding to the level-set information being less than or equal to a thickness value; and discarding the fluid particles corresponding to the level-set information being greater than the thickness value.

The method may also include: generating a texture of the target fluid based on the thickness map; and rendering the target fluid based on the texture of the target fluid.

Other features and aspects will be apparent from the following detailed description, the drawings, and the claims.

BRIEF DESCRIPTION OF THE DRAWINGS

FIG. 16 is a block diagram illustrating an example of an apparatus for rendering a target fluid, in accordance with an embodiment.

Figure 1A:
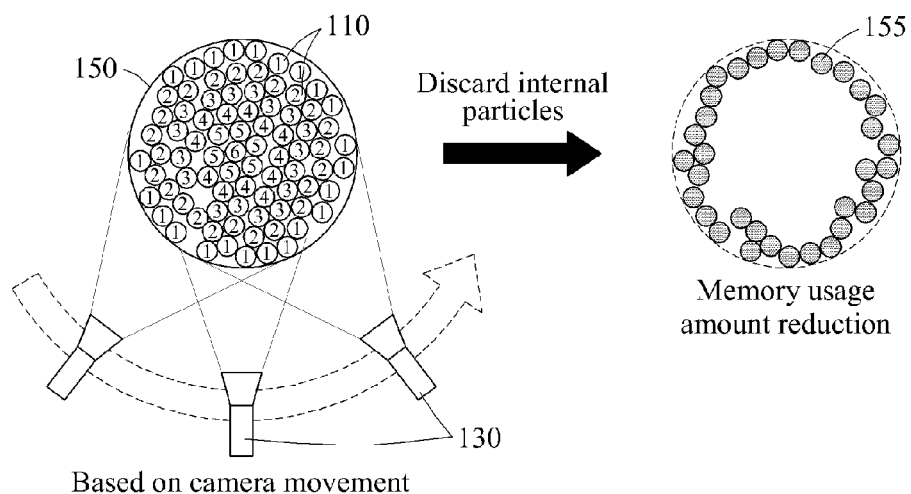
FIGS. 1A and 1B illustrate examples of a method of rendering a target fluid based on a movement of a camera and a target fluid modeled based on particles, in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, reference will now be made in detail to examples with reference to the accompanying drawings, wherein like reference numerals refer to like elements throughout.

Various alterations and modifications may be made to the examples. Here, the examples are not construed as limited to the disclosure and should be understood to include all changes, equivalents, and replacements within the idea and the technical scope of the disclosure.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

When an element is referred to as being "on," "connected to," "coupled to," or "adjacent to," another element, the element may be directly on, connected to, coupled to, or adjacent to, the other element, or one or more other intervening elements may be present.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

The following specific structural or functional descriptions are exemplary to merely describe the examples, and the scope of the examples is not limited to the descriptions provided in the present specification.

Unless otherwise defined, all terms including technical and scientific terms used herein have the same meaning as commonly understood by one of ordinary skill in the art to which examples belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The following embodiments may be performed in various apparatuses for modeling a fluid.

The embodiments may be implemented in various forms, for example, a personal computer, a laptop computer, a tablet computer, a smartphone, a television, a smart appliance, and a wearable device. The embodiments may be applied to process an image for modeling a fluid in, for example, a smartphone, a mobile device, and a smart home system. The embodiments may also be applied to, for example, a game machine, a virtual reality playing apparatus, a three-dimensional (3D) modeling apparatus. Hereinafter, reference will now be made in detail to examples with reference to the accompanying drawings, wherein like reference numerals refer to like elements throughout.

A rendering apparatus, according to embodiments, may be configured to be a hardware module. The rendering apparatus may be implemented in various forms, for example, a single processor based system, a multi-processor based system, a special-purpose hardware based system, a system including a combination of a processor and a hardware accelerator (HWA), and a cloud computing system.

Figure 1B:
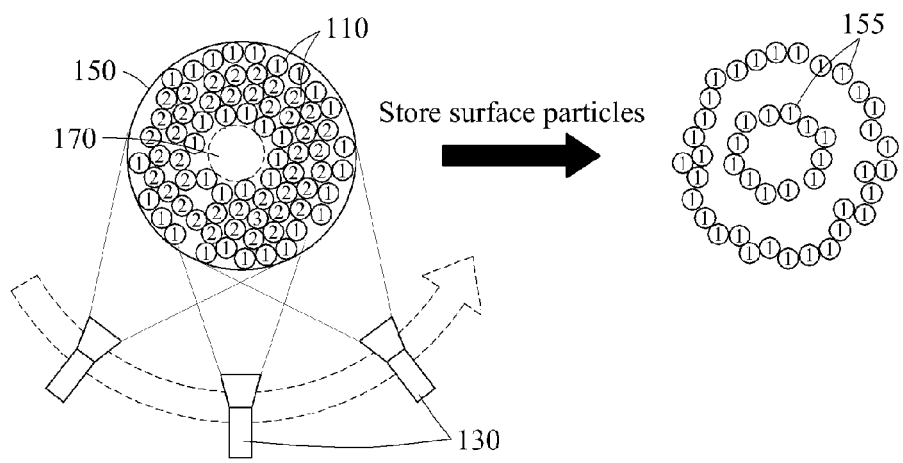

FIGS. 1A and 1B illustrate examples of a method of rendering a target fluid based on a movement of a camera and a target fluid modeled based on particles, in accordance with an embodiment.

For example, an attenuation color may be present in a fluid such as water. In terms of the attenuation color, a color of a deep portion may be seen to be relatively dark, and a color of a shallow portion may be seen to be relatively light. In response to a thickness of a fluid increasing, a degree of refraction by the fluid may increase. In response to the thickness of the fluid decreasing, the degree of refraction by the fluid may decrease. Thus, the thickness of the fluid may affect an attenuation color and refraction while the fluid is modeled. A rendering of the fluid based on the thickness of the fluid may generally require a large number of operations and a large amount of memory usage because image information on which a fluid is modeled needs to be stored in advance. In a mobile environment using limited storage resources, reducing the amount of memory usage may be required.

FIGS. 1A and 1B illustrate a movement of a camera 130 and fluid particles 110 according to a result of modeling a target fluid, for example, water, based on particles. The camera 130 may be a rendering camera. Referring to FIGS. 1A and 1B, numbers in the fluid particles 110 indicate level-set values of the fluid. A level-set value may be defined as a distance function having a value according to a distance between the fluid particles 110 and a fluid surface 150, for example, a boundary. The level-set value may be understood as a distance from the fluid surface 150, for example, a fluid boundary, to the fluid particles 110. The level-set value may be referred to as level-set information. In an example, the movement of the camera 130 may be considered from all angles of 360 degrees, and the level-set value may be also considered from all angles not just from one direction.

The level-set value being relatively high indicates a long distance from the fluid surface 150 to corresponding fluid particles. Thus, the corresponding fluid particles may be understood as internal particles configuring or building an inside of the target fluid. In an example, referring to FIG. 1A, in terms of a fluid particle of which the level-set value is 1, a distance from the fluid surface 150 to the corresponding fluid particle has a value of 1 such that the corresponding fluid particle is at a surface of the target fluid or is close to the surface. In another example, in terms of a fluid particle of which the level-set value is 5, a distance from the fluid surface 150 to the corresponding fluid particle has a value of 5 such that the corresponding fluid particle is an internal particle. In other words, a value of 5 is indicative of a particle inside the target fluid at a greatest distance from the surface of the target fluid. The internal particle is a fluid particle configuring the inside of the target fluid.

The inside or interior of the target fluid indicates a portion excluding the surface of the target fluid, and the surface is formed to be in contact with the target fluid and another object, or in contact with the target fluid and an empty space filled with air. The surface is an outside portion or uppermost layer of the target fluid. The surface of the target fluid may have a predetermined thickness. A thickness of the target fluid may be input by a user, for example, based on a form of an input value associated with the thickness of a fluid.

For example, the fluid surface 150 is an area in which the fluid particles 110 are in contact with an outside of the fluid as illustrated in FIG. 1A, or an area in which the fluid particles 110 are in contact with the outside of the fluid and an inside space 170 of the fluid. In this example, the inside space 170 of the fluid may be formed of air, as a rigid body, or as an elastic body, except of water.

In an example, the internal particles of the target fluid may be discarded by verifying that a level-set value of a fluid particle is greater than or less than a predetermined value based on a user input value. In response to the internal particles being discarded from the modeled target fluid, only surface particles 155 may remain as illustrated in the right-side diagrams in FIGS. 1A and 1B.

In an example, fluid particles verified to be internal particles may be discarded and information on the surface particles 155 configuring the surface of the fluid may be stored, thus, reducing memory usage. In addition, the thickness of the fluid is calculated based on group information and/or depth information on particles. Thus, a sense of depth may be expressed such that internal particles seem to exist even when the internal particles are discarded.

Figure 2:
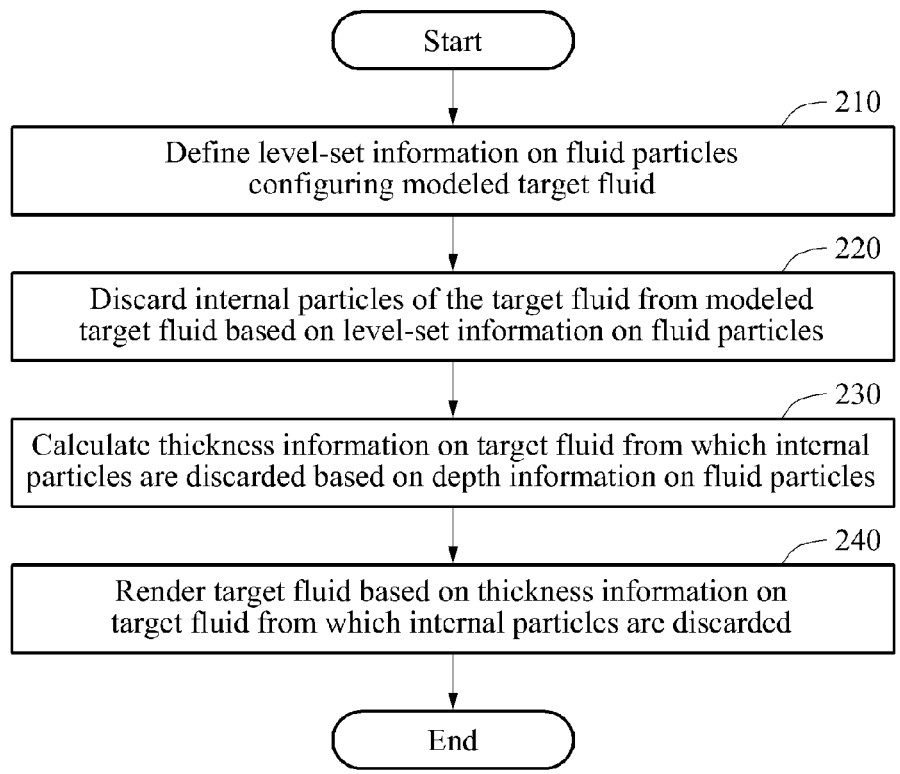
FIG. 2 is a flowchart illustrating an example of a method of rendering the target fluid, in accordance with an embodiment.

FIG. 2 is a flowchart illustrating an example of a method of rendering a target fluid, in accordance with an embodiment. Referring to FIG. 2, in operation 210, an apparatus to render a target fluid defines level-set information of fluid particles configuring a modeled target fluid. Hereinafter, the apparatus to render a target fluid will be referred to as a rendering apparatus. The rendering apparatus may include, at least, a processor or a controller. A person skilled in the relevant art will appreciate that the rendering apparatus may include multiple processors or controllers configured to perform or execute each of the functions illustrated in the flowchart of FIG. 2. The level-set information includes a shortest distance from a surface of the target fluid to the fluid particles.

In operation 220, the rendering apparatus discards internal particles of the target fluid from the modeled target fluid based on the level-set information of the fluid particles. A number of the internal particles of the target fluid to be discarded and a thickness of the target fluid to remain is determined by a predetermined thickness, for example, a value, or an input value from a user. A method of discarding the internal particles of the target fluid by the rendering apparatus will be described with reference to FIGS. 3 and 4.

In operation 230, the rendering apparatus calculates thickness information of the target fluid, from which the internal particles are discarded, based on depth information of the fluid particles. For example, the rendering apparatus calculates, at a point in time corresponding to a predetermined scene, the thickness information of the target fluid, from which the internal particles are discarded, based on the depth information of surface particles configuring the target fluid. A method of calculating the thickness information of the target fluid by the rendering apparatus will be described with reference to FIGS. 5 through 7.

In an example, the rendering apparatus groups the fluid particles based on particle information of fluid particles and discards the internal particles of the target fluid from the modeled target fluid based on the level-set information of the grouped fluid particles. Various embodiments of methods to calculate the thickness information of the target fluid by discarding the internal particles of the target fluid, based on the level-set information of the grouped fluid particles, will be described with reference to FIGS. 8 through 11.

Figure 15:
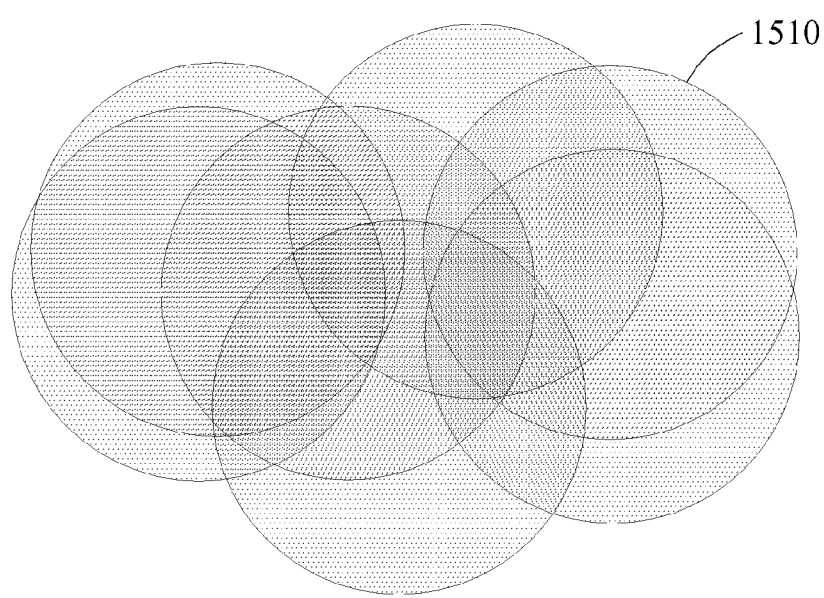
FIG. 15 illustrates an example of a thickness map generated, in accordance with an embodiment.

In operation 240, the rendering apparatus renders the target fluid based on the thickness information of the target fluid from which the internal particles are discarded. For example, the thickness information of the target fluid is provided in a form of a thickness map 1510, as illustrated in FIG. 15. The rendering apparatus generates a texture of the target fluid based on the thickness information of the target fluid from which the internal particles are discarded and renders the target fluid based on the texture of the target fluid.

Figure 3:
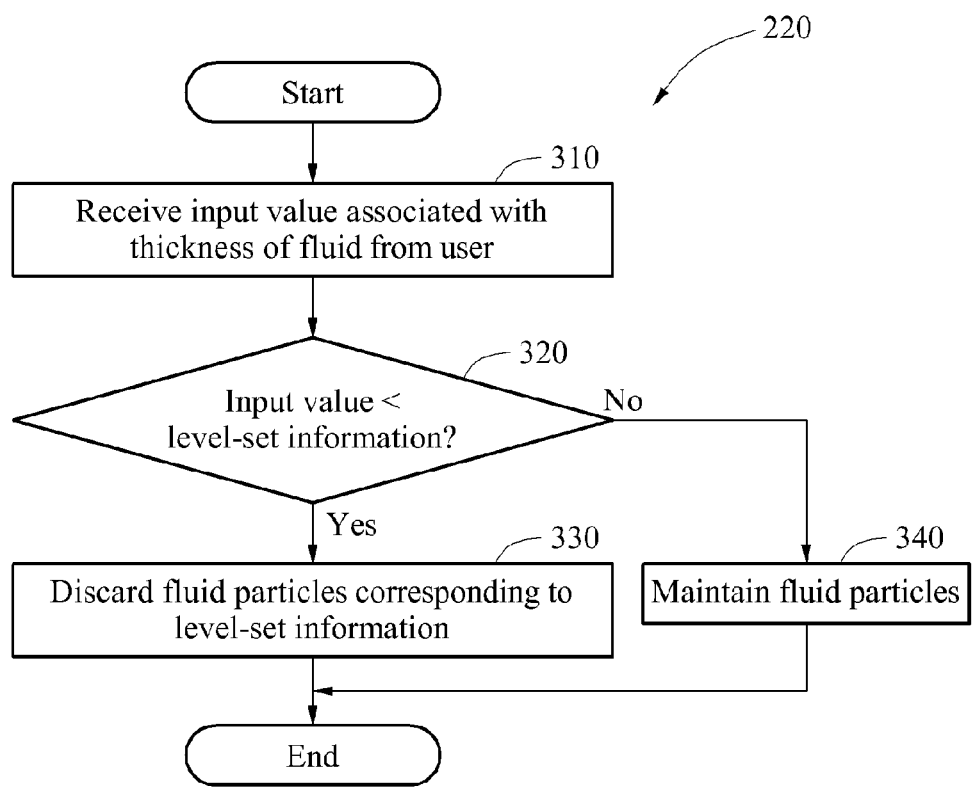
FIG. 3 is a flowchart illustrating an example of a method of discarding internal particles of the target fluid, in accordance with an embodiment.

FIG. 3 is a flowchart illustrating an example of a method of discarding the internal particles of the target fluid, in accordance with an embodiment. Referring to FIG. 3, in operation 310, the rendering apparatus receives an input value associated with a thickness of a fluid from a user. The input value may be associated with a thickness of a surface particle(s) or remaining thicknesses of fluid particles for rendering.

The rendering apparatus discards the internal particles of the target fluid based on a result of a comparison between the input value and the level-set information. In operation 320, the rendering apparatus verifies whether the level-set information on the fluid particles is greater than the input value.

Based on a result of the verification performed in operation 320, in response to the level-set information being greater than the input value, in operation 330, the rendering apparatus discards the internal particles. The internal particles indicate the fluid particles corresponding to the level-set information greater than the input value.

Based on a result of the verification performed in operation 320, in response to the level-set information being less than or equal to the input value, in operation 340, the rendering apparatus maintains the fluid particles without discarding any fluid particles. The level-set information of the fluid particles being less than or equal to the input value indicates that the fluid particles correspond to the surface particles. Thus, the rendering apparatus may intactly maintain the fluid particles.

Figure 4:
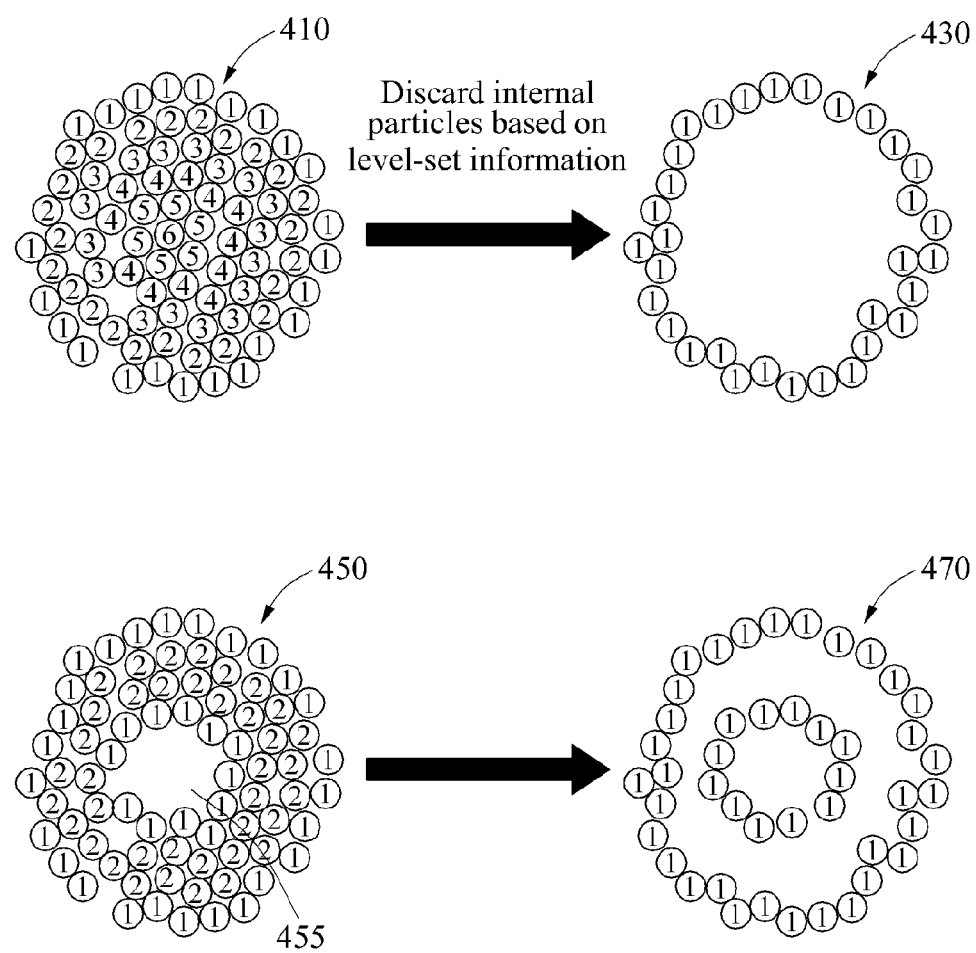
FIG. 4 illustrates examples of a method of discarding the internal particles of the target fluid, in accordance with an embodiment.

FIG. 4 illustrates examples of a method of discarding internal particles of a target fluid, in accordance with an embodiment. Referring to FIG. 4, a process in which a rendering apparatus discards internal particles of a target fluid is described.

In one example, the target fluid is entirely filled with fluid particles 410. In another example, the target fluid 450 has an empty space inside 455. The inside space 455 may contain air or an object, for example, an elastic body and a rigid body, other than water. When other objects other than water exist in the inside space 455, a fluid surface also exists around the inside space 455 of the fluid 450. Each number of the fluid particles configuring the fluids 410 and 450 are indicative of level-set information on each of the fluid particles.

The rendering apparatus discards the internal particles of the target fluid by comparing an input value received from a user to the level-set information of the fluid particles configuring the target fluid. The input value received from the user corresponds to a thickness of the target fluid to be rendered by the rendering apparatus.

In response to a level-set value being greater than or equal to a user input value or the level-set information being less than a predetermined value based on a representation method of a level-set, the rendering apparatus discards the fluid particles corresponding to the level-set information greater than or less than the predetermined value. For example, in response to an input value "1" received from the user, the rendering apparatus generates target fluids 430 and 470 from which internal particles are discarded by discarding fluid particles corresponding to level-set information indicating "2", "3", "4", and "5" greater than the input value "1", from the modeled target fluid 410 and 450.

Figure 5:
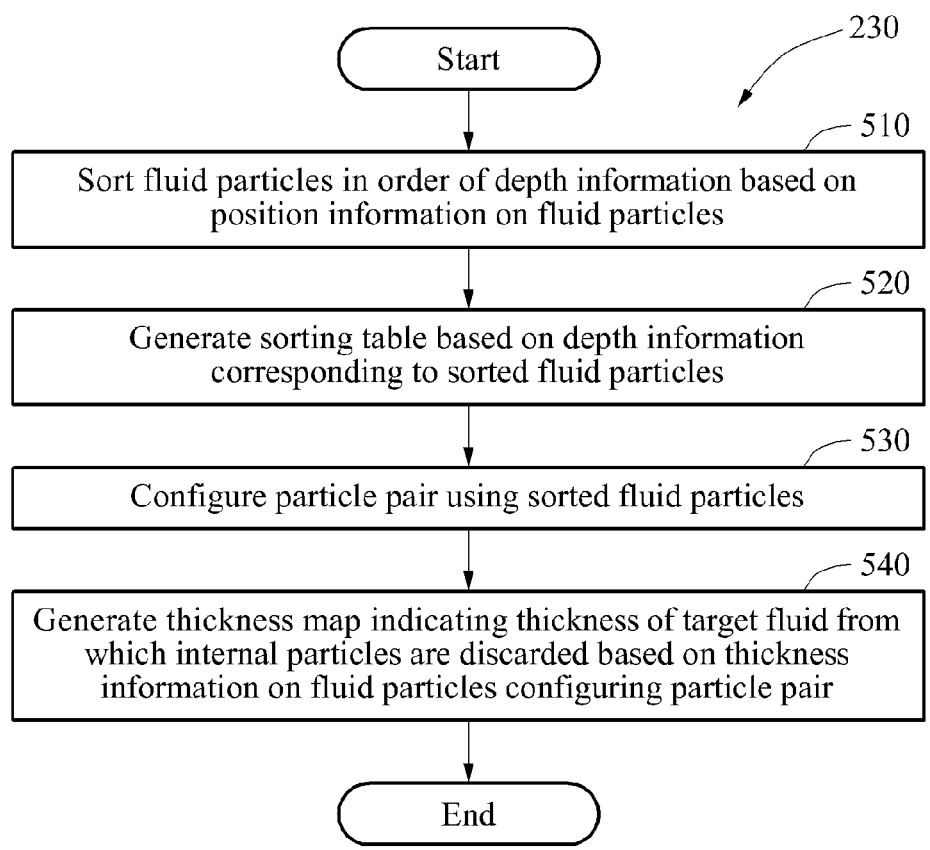
FIG. 5 is a flowchart illustrating an example of a method of calculating thickness information of the target fluid from which the internal particles are discarded, in accordance with an embodiment.

FIG. 5 is a flowchart illustrating an example of a method of calculating thickness information of a target fluid from which internal particles are discarded, in accordance with an embodiment. Referring to FIG. 5, in operation 510, a rendering apparatus sorts fluid particles in an order of depth information based on position information of the fluid particles within the target fluid. In one embodiment, the rendering apparatus calculates the depth information from a virtual camera based on position information of fluid particles of a target fluid from which internal particles are discarded and sorts the fluid particles based on the depth information. In accordance with an alternative embodiment, another reference point, other than the virtual camera, may be used to calculate the depth information. For instance, the depth information may be based from an internal human organ to the position from which the target fluid is being analyzed. The position information of the fluid particles may be predetermined and stored during modeling.

In operation 520, the rendering apparatus generates a sorting table based on the depth information corresponding to the sorted fluid particles. The sorting table generated by the rendering apparatus will be described with reference to FIGS. 6 and 7.

In operation 530, the rendering apparatus configures a particle pair using the sorted fluid particles. For example, the rendering apparatus configures, based on a virtual camera 708, a particle pair including a fluid particle 701 and a fluid particle 702 in an order of a proximity to the virtual camera 708 among the sorted fluid particles, and configures another particle pair including fluid particle 703 and 704, which are subsequently proximate to the virtual camera 708.

In operation 540, the rendering apparatus generates a thickness map, which indicates a thickness of the target fluid from which the internal particles are discarded based on thickness information of the fluid particles configuring the particle pair. For example, the thickness map generated based on the thickness information of the fluid particles may be provided in a form as illustrated in FIG. 15.

Figure 6:
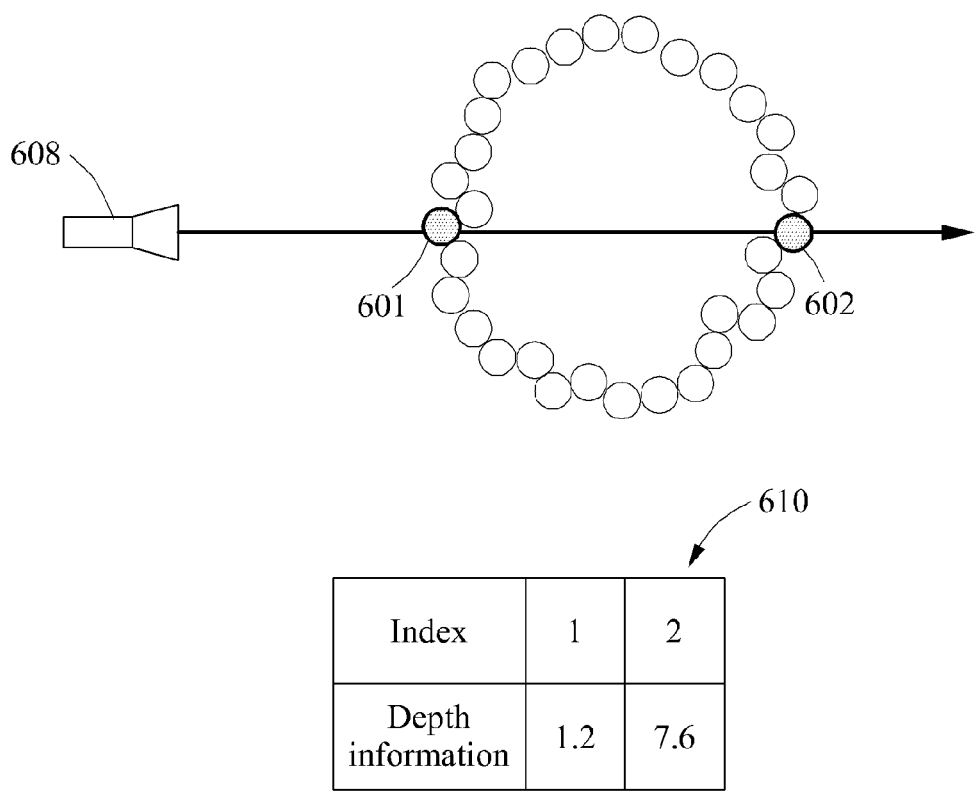
FIGS. 6 and 7 illustrate examples of a sorting table generated, in accordance with an embodiment.
Figure 7:
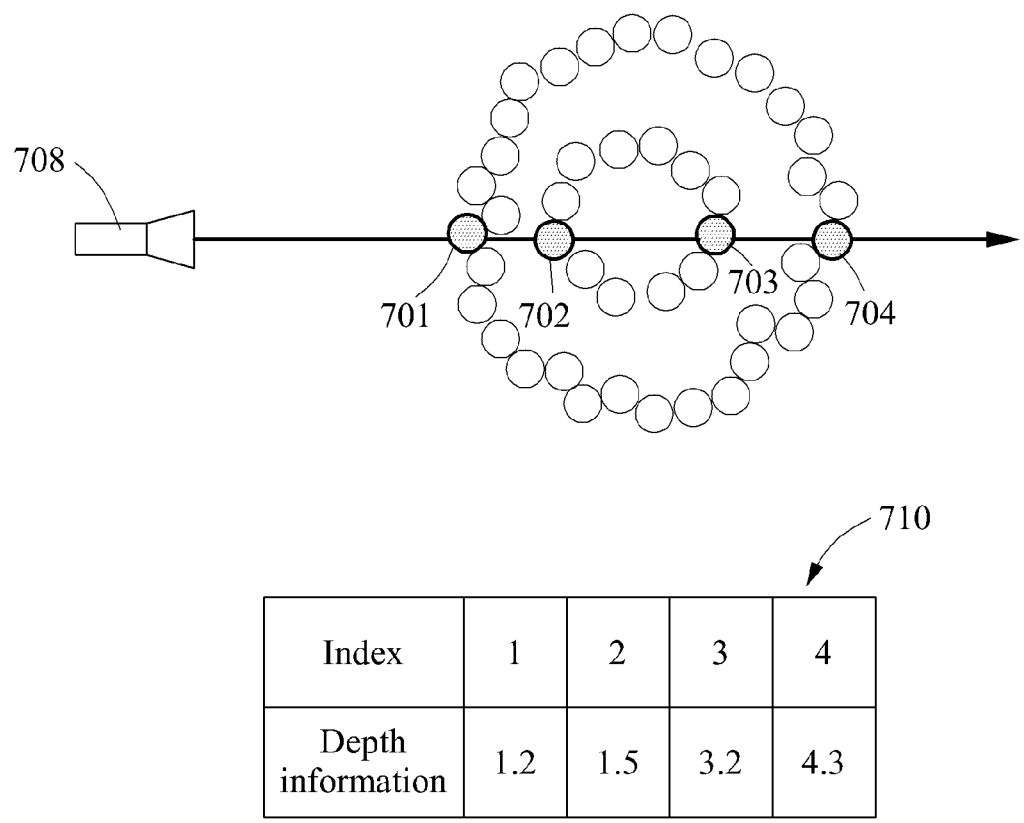

FIGS. 6 and 7 illustrate sorting tables generated, in accordance with an embodiment. FIG. 6 illustrates a sorting table 610 in which fluid particles 601 and 602 are sorted, and a position relationship between a virtual camera 608 and the fluid particles 601 and 602. In this example, the sorting table 610 corresponds to the target fluid 430 from which the internal particles are discarded from the target fluid 410 of which the inside is entirely filled with the fluid particles as illustrated in FIG. 4. For example, the fluid particles 601 and 602 of the target fluid 430, from which the internal particles are discarded, are arranged from the virtual camera 608 as illustrated in FIG. 6. However, as previously explained, other configurations may be implemented to select fluid particles of the target fluid 430, from which non-selected internal particles are discarded.

The rendering apparatus sorts the fluid particles 601 and 602 of the target fluid 430 from which the internal particles are discarded in an order of the depth information on fluid particles. In one example, the depth information is a distance from the virtual camera 608 calculated based on the position information of fluid particles. For example, a distance between the fluid particle 601 and the virtual camera 608 is measured as "1.2", and a distance between the fluid particle 602 and the virtual camera 608 is measured as "7.6". The rendering apparatus assigns Index 1 to the fluid particle 601 and assign Index 2 to the fluid particle 602, in an order arranged based on the depth information. The rendering apparatus configures a particle pair using the fluid particles 601 and 602 sorted as shown in the sorting table 610.

The rendering apparatus generates the thickness map indicating thickness information of the fluid particles by calculating a depth difference of 6.4 millimeters (mm) (7.6−1.2=6.4) between the fluid particles 601 and 602 configuring the particle pair to be added to the thickness map. The thickness map is initialized to be "0", and subsequently, accumulates depth differences with respect to each particle pair.

FIG. 7 illustrates a sorting table 710 in which fluid particles 701, 702, 703, and 704 are sorted and a position relationship between a virtual camera 708 and the fluid particles 701, 702, 703, and 704 corresponding to the target fluid 470 from which the internal particles are discarded from the target fluid 450 of which the inside space 455 is empty.

For example, the fluid particles 701, 702, 703, and 704 are assumed to be arranged with respect to the virtual camera 708 as illustrated in FIG. 7. Based on the position information of the fluid particles 701, 702, 703, and 704, using a same method as the method of FIG. 6, the rendering apparatus calculates, from the virtual camera 708, the depth information of each of the fluid particles 701, 702, 703, and 704 of the target fluid 470, from which the internal particles are discarded, and sorts the fluid particles 701, 702, 703, and 704 of the target fluid 470, from which the internal particles are discarded, in an order of the depth information on the fluid particles. The rendering apparatus assigns Indexes 1, 2, 3, and 4 to the fluid particles 701, 702, 703, and 704, respectively, which is an order sorted based on the depth information. The rendering apparatus configures particle pairs by sequentially combining two of the fluid particles sorted as in the sorting table 710.

For example, the rendering apparatus configures the fluid particles 701 and 702 corresponding to the Indexes 1 and 2 as a first particle pair. The rendering apparatus also configures the fluid particles 703 and 704 corresponding to the Indexes 3 and 4 as a second particle pair.

In an embodiment, the rendering apparatus adds, to a thickness map, a depth difference of 0.3 mm (1.5−1.2=0.3) between the fluid particles 701 and 702 configuring the first particle pair. The rendering apparatus generates a thickness map having a thickness of 1.4 mm by adding a depth difference of 1.1 mm (4.3−3.2=1.1) between the fluid particles 703 and 704 to a thickness map having a thickness or a depth difference of 0.3 mm, between the fluid particles 701 and 702. The rendering apparatus stores the thickness or a depth difference of 1.4 mm of a final thickness map.

In an example, the rendering apparatus reflects the depth difference of a particle pair in the depth map and then deletes information on the particle pair to which the depth difference is reflected.

Even when the internal particles of the target fluid are discarded using the calculated thickness of the thickness map, for example, even when modeling is performed without using all particles configuring a fluid, the rendering apparatus obtains a rendering result similar to a result of rendering a fluid modeled using all particles.

In one embodiment, the fluid particles modeled using particles are positioned adjacent to each other as described above, or positioned spaced apart from each other. Hereinafter, a method is described to render a target fluid when modeled fluid particles are positioned spaced apart from each other in a plurality of groups.

Figure 8:
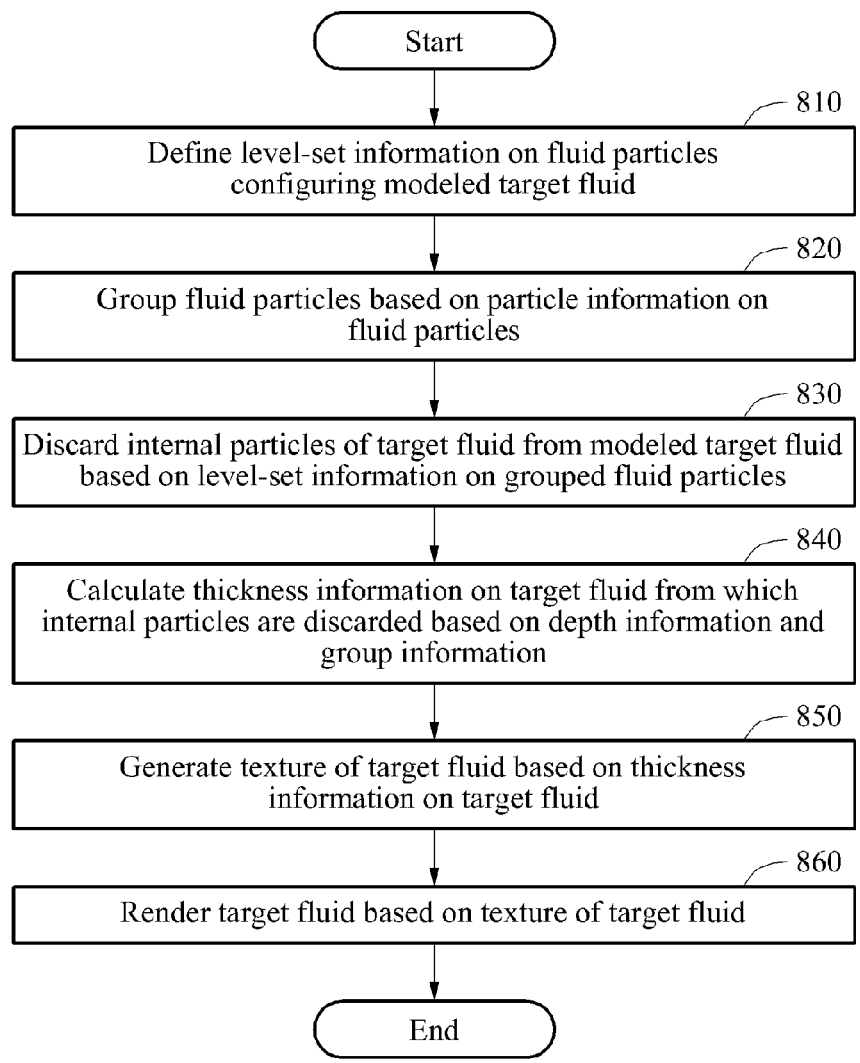
FIG. 8 is a flowchart illustrating another example of a method of rendering a target fluid, in accordance with an embodiment.

FIG. 8 is a flowchart illustrating another example of a method of rendering a target fluid, in accordance with an embodiment. Referring to FIG. 8, in operation 810, a rendering apparatus defines level-set information of fluid particles configuring a modeled target fluid.

In operation 820, the rendering apparatus groups the fluid particles based on particle information of the fluid particles including the level-set information of the fluid particles. For example, the particle information includes position information, for example, a distance and a coordinate, of the fluid particles, information on neighbor particles of the fluid particles, and the level-set information of the fluid particles. The particle information may be calculated in real-time and calculated in advance through a preprocessing process. The particle information may further include group information in which each of the fluid particles is assigned to a group through a grouping process. The particle information may be updated.

In operation 820, the rendering apparatus groups adjacent particles as belonging to or being associated with a same group based on a distance between each of the fluid particles. For example, the rendering apparatus groups the fluid particles based on distances between the fluid particles and the neighbor particles of the fluid particles. That is, the rendering apparatus groups the fluid particles and the neighbor particles of the fluid particles that are within a predetermined distance from each other. The method of grouping the fluid particles by the rendering apparatus will be described with reference to FIGS. 9 and 10.

In operation 830, the rendering apparatus discards the internal particles of the target fluid, from the modeled target fluid, based on the level-set information of the grouped fluid particles as grouped in operation 820. The level-set information includes a shortest distance from a surface of the target fluid to the fluid particles. The method of discarding the internal particles of the target fluid by the rendering apparatus is described with reference to FIGS. 3 and 4.

In operation 840, the rendering apparatus calculates thickness information of the target fluid, from which the internal particles are discarded, based on depth information and the group information. In an embodiment, the depth information on the fluid particles is defined as a distance between a virtual camera, for example, a rendering camera, and each of the fluid particles. The rendering apparatus calculates fluid thickness information based on the virtual camera using the group information and the difference of the depth information on the fluid particles. The method of calculating the thickness information of the target fluid by the rendering apparatus will be described with reference to FIGS. 11 and 12.

In operation 850, the rendering apparatus generates a texture of the target fluid based on the thickness information of the target fluid calculated in operation 840.

In operation 860, the rendering apparatus renders the target fluid based on the texture of the target fluid generated in operation 850.

Figure 9:
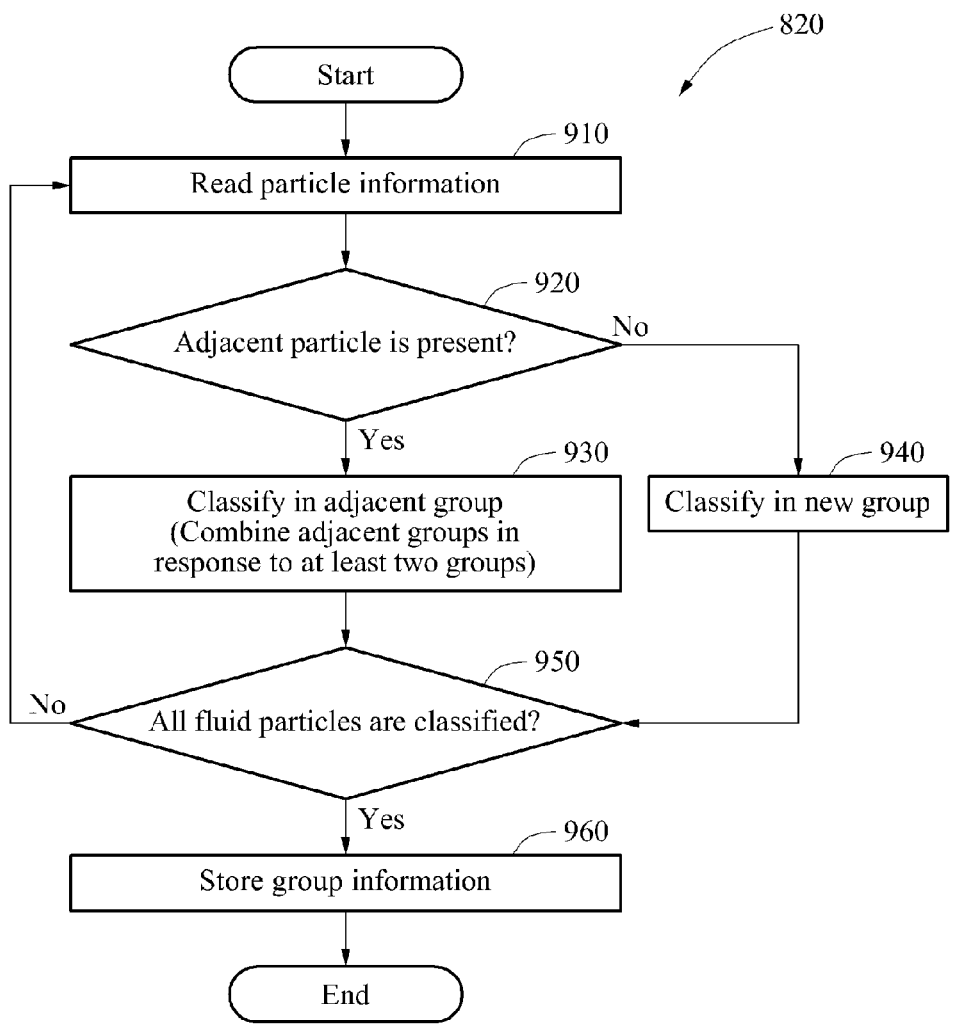
FIG. 9 is a flowchart illustrating an example of a process of grouping fluid particles, in accordance with an embodiment.

FIG. 9 is a flowchart illustrating an example of a process of grouping fluid particles, in accordance with an embodiment. Referring to FIG. 9, in operation 910, a rendering apparatus reads particle information of any one fluid particle configuring a target fluid. In operation 920, the rendering apparatus verifies whether an adjacent particle grouped with the fluid particle is present based on information on neighbor particles of the fluid particle and position information of the fluid particle included in the particle information. Adjacent particle may be defined as having the same meaning as neighbor particle.

In response to a result of verifying that the grouped adjacent particle is present in operation 920, in operation 930, the rendering apparatus classifies the fluid particle in an identical adjacent group including the adjacent particle in operation 930. When adjacent particles to the fluid particle are included in at least two adjacent groups, the rendering apparatus combines the at least two adjacent groups.

In response to the result of verifying that the grouped adjacent particle is not present in operation 920, the rendering apparatus classifies the fluid particle in a new group in operation 940.

In operation 950, the rendering apparatus verifies that all fluid particles configuring the target object are classified. In response to a result of verifying that remaining fluid particles are present without being classified in operation 950, the rendering apparatus returns to operation 910 to read particle information of the remaining fluid particles and perform a subsequent operation.

In response to the result of verifying that remaining fluid particles are not present without being classified in operation 950, the rendering apparatus stores group information of the fluid particles classified in each group in operation 960. A result of grouping the fluid particles is as illustrated in FIG. 10.

Figure 10:
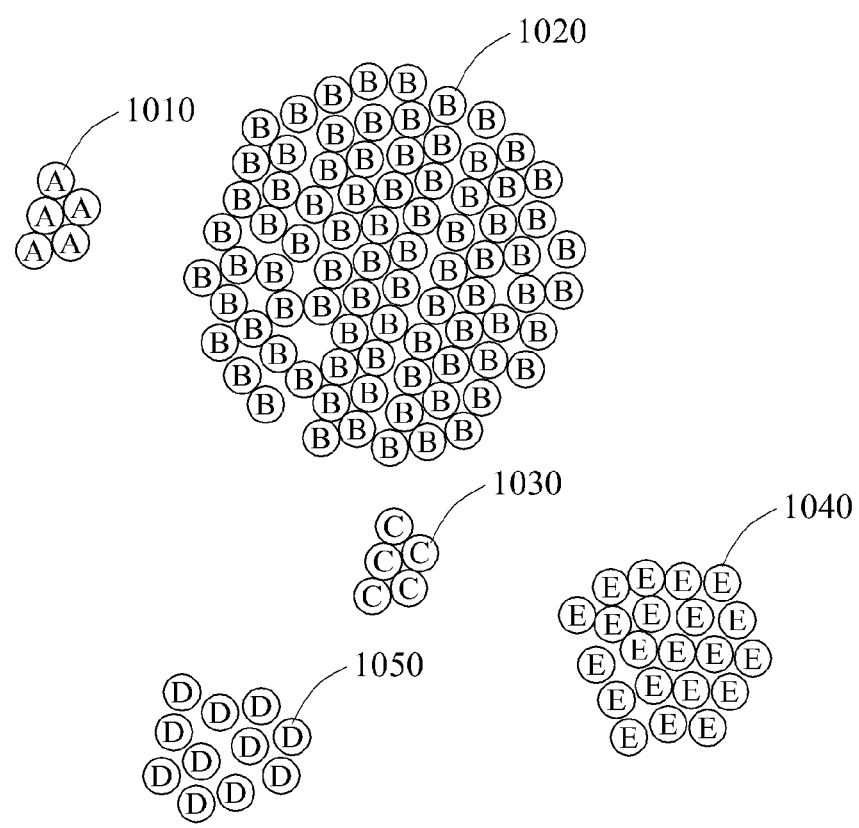
FIG. 10 illustrates examples of the grouped fluid particles, in accordance with an embodiment.

FIG. 10 illustrates examples of grouped fluid particles, in accordance with an embodiment. Referring to FIG. 10, a result of grouping fluid particles by a rendering apparatus will be described.

Each of the signs (characters) in fluid particles illustrated in FIG. 10 indicates information on a group to which a corresponding fluid particle belongs. In an example, particles among the fluid particles adjacent to each other, based on a distance to neighbor particles, are grouped in an identical group. Group information based on grouping is assigned to the fluid particles grouped in an identical group. For example, the group information includes a group identification (ID).

For example, the rendering apparatus calculates distances between the fluid particles and the neighbor particles from information about neighbor particles of the fluid particles included in particle information. The rendering apparatus groups the fluid particles based on the distances between the fluid particles and the neighbor particles. For example, the rendering apparatus groups the neighbor particles within a distance of 0.05 mm in an identical group.

The rendering apparatus groups the fluid particles in a group A 1010, a group B 1020, a group C 1030, a group D 1040, and a group E 1050 based on the distances between the fluid particles and the neighbor particles.

Figure 11:
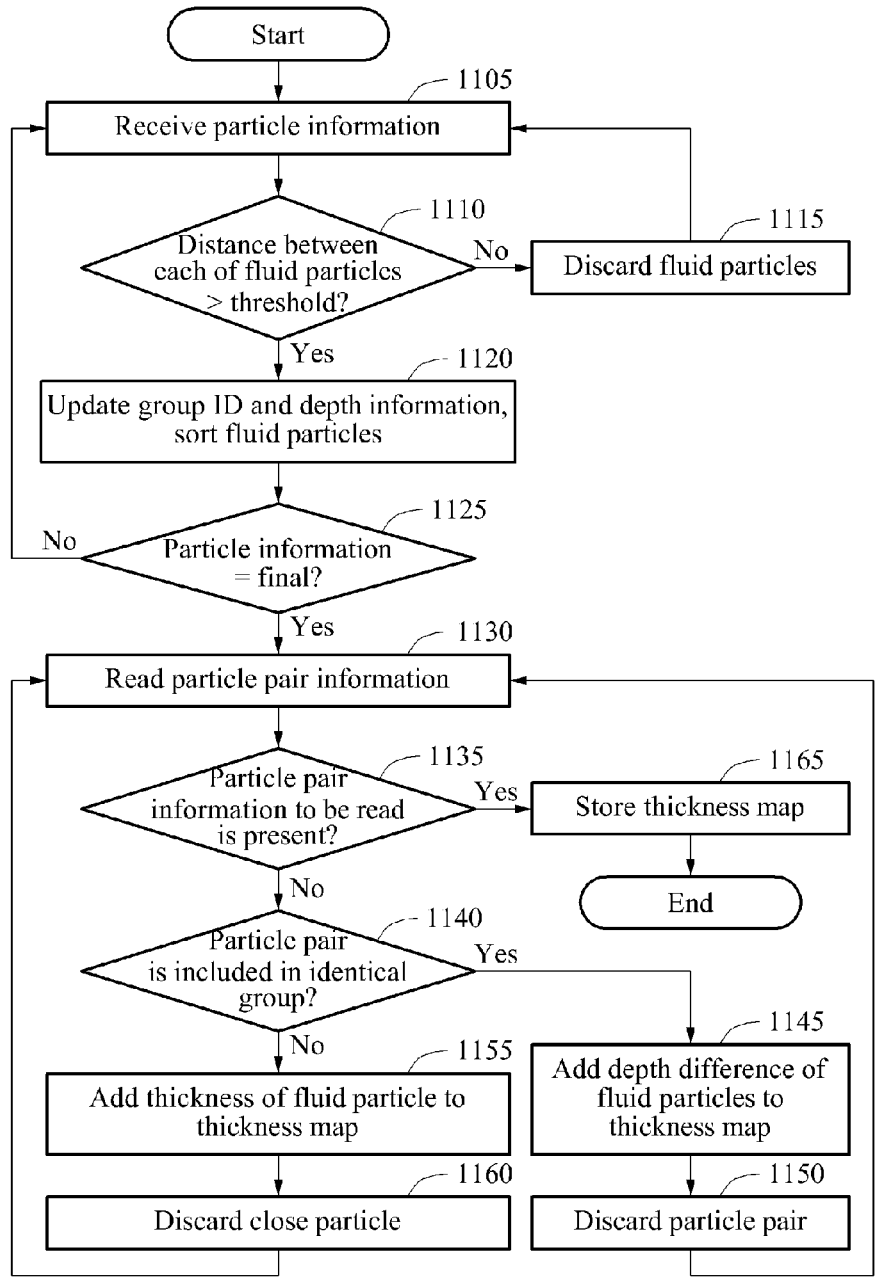
FIG. 11 is a flowchart illustrating an example of a process of calculating a thickness of the target fluid from which internal particles are discarded, in accordance with an embodiment.

FIG. 11 is a flowchart illustrating an example of a process of calculating a thickness of a target fluid from which internal particles are discarded, in accordance with an embodiment. In operation 1105, a rendering apparatus receives or determines particle information of fluid particles. In operation 1110, the rendering apparatus compares a distance between each of the fluid particles calculated based on the particle information and a predetermined threshold. In operation 1110, in response to the distance between each of the fluid particles being less than or equal to the predetermined threshold, for example, in response to the fluid particles overlapping or adjoining, in operation 1115, the rendering apparatus discards the corresponding fluid particles and receives particle information of new fluid particles. For example, the threshold corresponds to (diameter of fluid particle+α). Here, α is a constant. The rendering apparatus calculates a fluid thickness of fluid particles to be separated from each other by a distance greater than or equal to a predetermined distance between each of the fluid particles configuring the target fluid.

In operation 1110, in response to the distance between each of the fluid particles being greater than the predetermined threshold, at operation 1120, the rendering apparatus updates the group ID and depth information on fluid particles separated from each other by a distance greater than the diameters of the fluid particles, and sorts the fluid particles. In operation 1120, the rendering apparatus may sort the fluid particles in an order of proximity of the fluid particles from a virtual camera. For example, the virtual camera is a rendering camera. In one embodiment, the rendering camera generates an array or a sorting table based on depth information on the sorted fluid particles and group information of fluid particles corresponding to the depth information.

Figure 12:
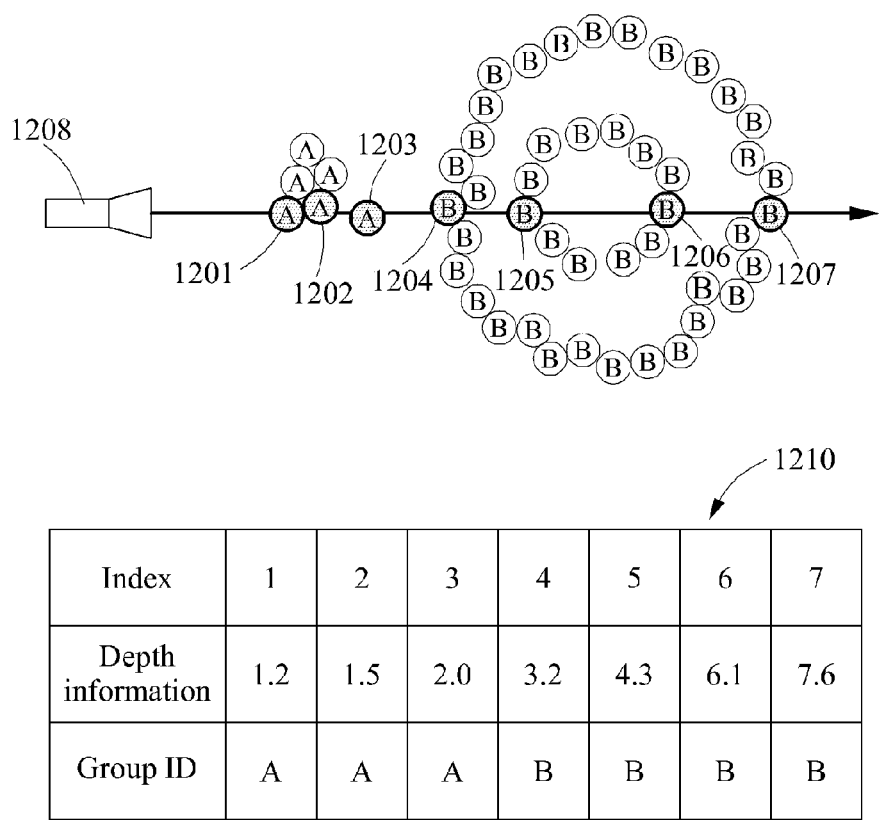
FIG. 12 illustrates another example of a sorting table generated, in accordance with an embodiment.

The rendering apparatus configures a particle pair in an order of proximity of the fluid particles based on the virtual camera. For example, the rendering apparatus configures a particle pair by combining two fluid particles, for example, fluid particles 1201 and 1202, in an order of proximity of fluid particles from a virtual camera 1208, as illustrated in FIG. 12, and configures another particle pair by combining two fluid particles, for example, fluid particles 1203 and 1204, which are subsequently proximate to the virtual camera 1208. The sorting table and the particle pair configured by the rendering apparatus will be described with reference to FIG. 12.

In operation 1125, the rendering apparatus verifies whether the received particle information is final, for example, whether the subsequent particle information is absent or not present. In operation 1125, in response to the particle information verified to be final, in operation 1130, the rendering apparatus reads particle pair information and compares the fluid particles included in the particle pair.

In operation 1135, the rendering apparatus verifies that the particle pair information to be read is present. In response to the particle pair information to be read being present, in operation 1140, the rendering apparatus verifies whether the fluid particles included in the particle pair are included in an identical group. In operation 1140, in response to the fluid particles included in the particle pair verified to be included in the identical group, in operation 1145, the rendering apparatus adds a depth difference of the fluid particles to a thickness map. In operation 1150, the rendering apparatus discards a particle pair of which the depth difference is added to the thickness map, and, at operation 1130, the rendering apparatus reads new particle pair information.

In operation 1140, in response to the fluid particles included in the particle pair verified to be excluded from or outside the identical group, in operation 1150, the rendering apparatus adds a thickness of a fluid particle to the thickness map. In operation 1160, the rendering apparatus discards a fluid particle close to a virtual camera among two fluid particles configuring a particle pair, and, in operation 1130, the rendering apparatus subsequently reads the new particle pair information.

In response to the result of the verification that the particle pair information to be read is not present, in operation 1165, the rendering apparatus stores a final thickness map. The thickness map finally stored will be described with reference to FIG. 15.

The rendering apparatus generates a thickness texture by calculating a thickness of a target fluid based on, for example, an operation of adding a depth difference of particles or a thickness of a particle to a thickness map, with respect to each pixel of a rendering plane, which the virtual camera views.

FIG. 12 illustrates an example of a sorting table and a method of generating a thickness map using the sorting table, in accordance with an embodiment. FIG. 12 illustrates a sorting table 1210 and a position relationship with a virtual camera and fluid particles, when the fluid particles included in a particle pair are excluded from or outside an identical group. Each of the signs in fluid particles 1201, 1202, 1203, 1204, 1205, 1206, and 1207 indicates group information of a fluid particle.

For example, the fluid particles 1201, 1202, 1203, 1204, 1205, 1206, and 1207 are assumed to be arranged from the virtual camera 1208 as illustrated in FIG. 12. A rendering apparatus sorts the fluid particles 1201, 1202, 1203, 1204, 1205, 1206, and 1207 of a target fluid from which internal particles are discarded in an order of depth information on fluid particles. In this example, the depth information is a distance between the virtual camera 1208 and a fluid particle calculated based on position information of the fluid particles. The rendering apparatus assigns Indexes 1, 2, 3, 4, 5, 6, and 7 to the fluid particles 1201, 1202, 1203, 1204, 1205, 1206, and 1207 in an order sorted based on the depth information.

The rendering apparatus configures a particle pair using the fluid particles sorted as expressed in the sorting table 1210.

The rendering apparatus configures the fluid particles 1201 and 1202 corresponding to the Indexes 1 and 2 as a first particle pair. Because the fluid particles 1201 and 1202 configuring the first particle pair are included in an identical group or in a same group of fluid particles, the rendering apparatus adds, to a thickness map, a depth difference of 0.3 mm (1.5−1.2=0.3) between the fluid particles configuring each particle pair.

The rendering apparatus configures the fluid particles 1203 and 1204 corresponding to the Indexes 3 and 4 as a second particle pair. Each group ID of the fluid particles 1203 and 1204 configuring the second particle pair are A and B, and each group ID are included in different groups. Because the fluid particles 1203 and 1204 configuring the second particle pair are not included in, excluded from, or outside a same group of fluid particles, the rendering apparatus adds a thickness, for example, 0.01 mm, of a single fluid particle to the thickness map and then discards any one fluid particle from a particle pair. In an example, the rendering apparatus discards any one fluid particle from the particle pair without adding the thickness, for example, 0.01 mm, of the single fluid particle to the thickness map. The rendering apparatus searches for a fluid particle of which the depth difference is small. For instance, the rendering apparatus searches for a fluid particle close to neighboring particles in the sorting table 1210, among the fluid particles 1203 and 1204. A distance between the fluid particle 1203 and neighbor particles is 0.5 mm (2.0−1.5=0.5), and a distance between the fluid particle 1204 and the neighbor particles is 1.2 mm (3.2−2.0=1.2). The rendering apparatus discards, from the sorting table 1210, information on the fluid particle 1203, which is closer to the neighbor particles than the fluid particle 1204.

The rendering apparatus discards the information on the fluid particle 1203 from the sorting table 1210 and read particle pair information again. Because the information on the fluid particle 1203 is discarded from the sorting table 1210, the rendering apparatus configures the fluid particles 1204 and 1205 corresponding to the Indexes 4 and 5 as a third particle pair. Because the fluid particles 1204 and 1205 configuring the third particle pair are included in a same group of fluid particles, the rendering apparatus adds, to the thickness map, a depth difference of 1.1 mm (4.3−3.2=1.1) between the fluid particles configuring each particle pair.

Subsequently, the rendering apparatus configures the fluid particles 1206 and 1207 corresponding to the Indexes 6 and 7 as a fourth particle pair. Because the fluid particles 1206 and 1207 configuring the fourth particle pair are included in an identical group, the rendering apparatus adds, to the thickness map, a depth difference of 1.5 mm (7.6−6.1=1.5) between the fluid particles configuring each particle pair. The rendering apparatus stores a thickness of 0.3 mm+0.01 mm+1.1 mm+1.5 mm=2.91 mm of a final thickness map.

Figure 13:
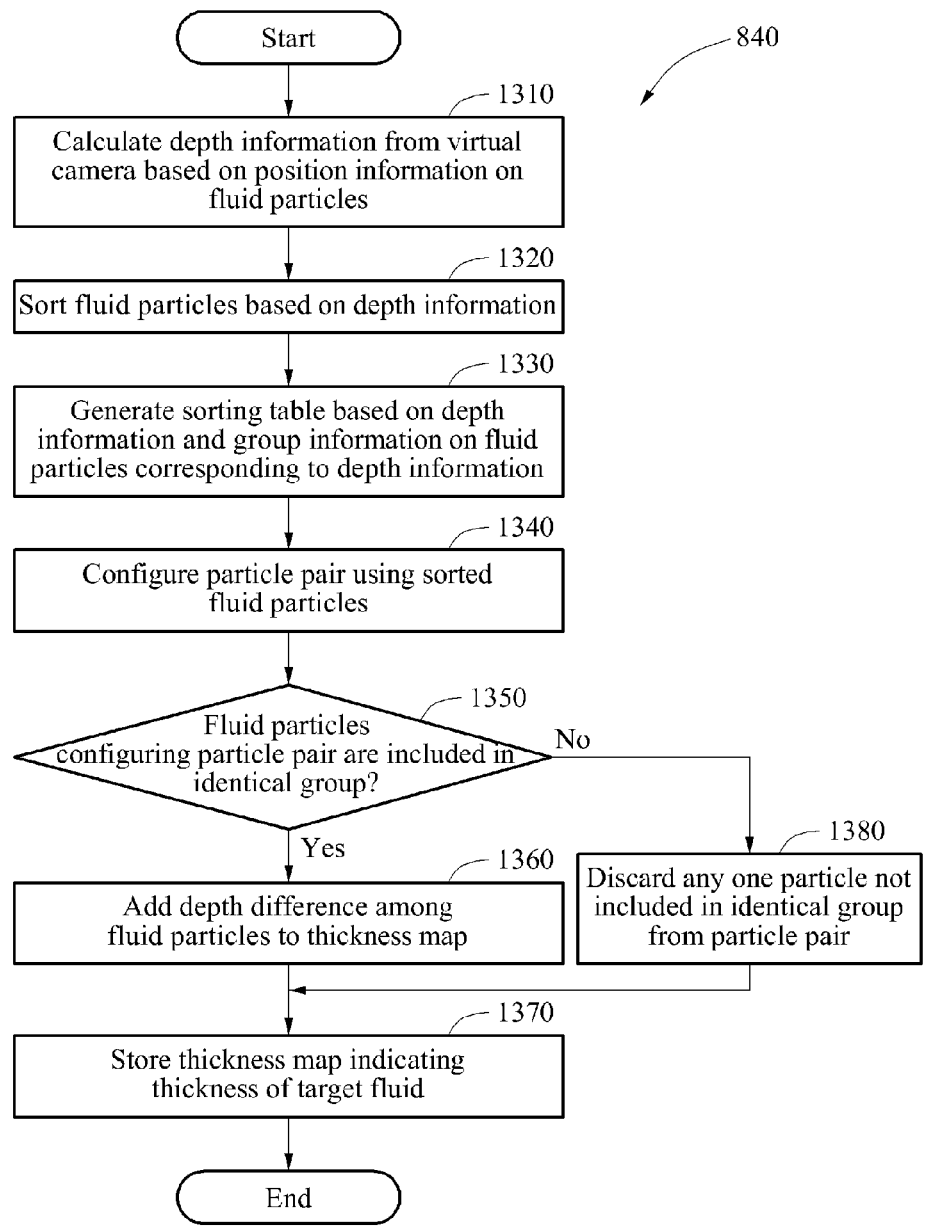
FIG. 13 is a flowchart illustrating another example of a method of calculating a thickness of a target fluid from which internal particles are discarded, in accordance with an embodiment.

FIG. 13 is a flowchart illustrating another example of a method of calculating a thickness of a target fluid from which internal particles are discarded, in accordance with an embodiment. Referring to FIG. 13, in operation 1310, a rendering apparatus calculates depth information from a virtual camera based on position information of fluid particles.

In operation 1320, the rendering apparatus sorts the fluid particles based on the depth information.

In operation 1330, the rendering apparatus generates a sorting table based on the depth information and group information of the fluid particles corresponding to the depth information. In an example, the rendering apparatus generates the sorting table based on level-set information of the fluid particles corresponding to the depth information in addition to the depth information. In operation 1340, the rendering apparatus configures a particle pair using the sorted fluid particles.

In operation 1350, the rendering apparatus verifies whether fluid particles configuring the particle pair are included in an identical group. Based on a result of the verification in operation 1350, in response to the fluid particles configuring the particle pair not being included in, excluded from, or outside an identical group, in operation 1380, the rendering apparatus discards, from the particle pair, any one fluid particle not included in, excluded from, or outside the identical group and, at operation 1370, the rendering apparatus stores a thickness map indicating a thickness of a target fluid. For example, the rendering apparatus discards a fluid particle close to neighbor particles among two fluid particles configuring a particle pair, such as, a fluid particle of which a depth difference with neighbor particles is small.

Based on the result of the verification in operation 1350, in response to the fluid particles configuring the particle pair being included in the identical group, in operation 1360, the rendering apparatus adds to a thickness map a depth difference among the fluid particles configuring the particle pair. The rendering apparatus may terminate an operation after storing the thickness map in operation 1370. In an example, the method to generate the thickness map based on the depth information, the group information, and the level-set information of the fluid particles is described. However, the method of generating the thickness map is not limited thereto. The thickness map may be also generated based on various types of information on fluid particles.

Figure 14:
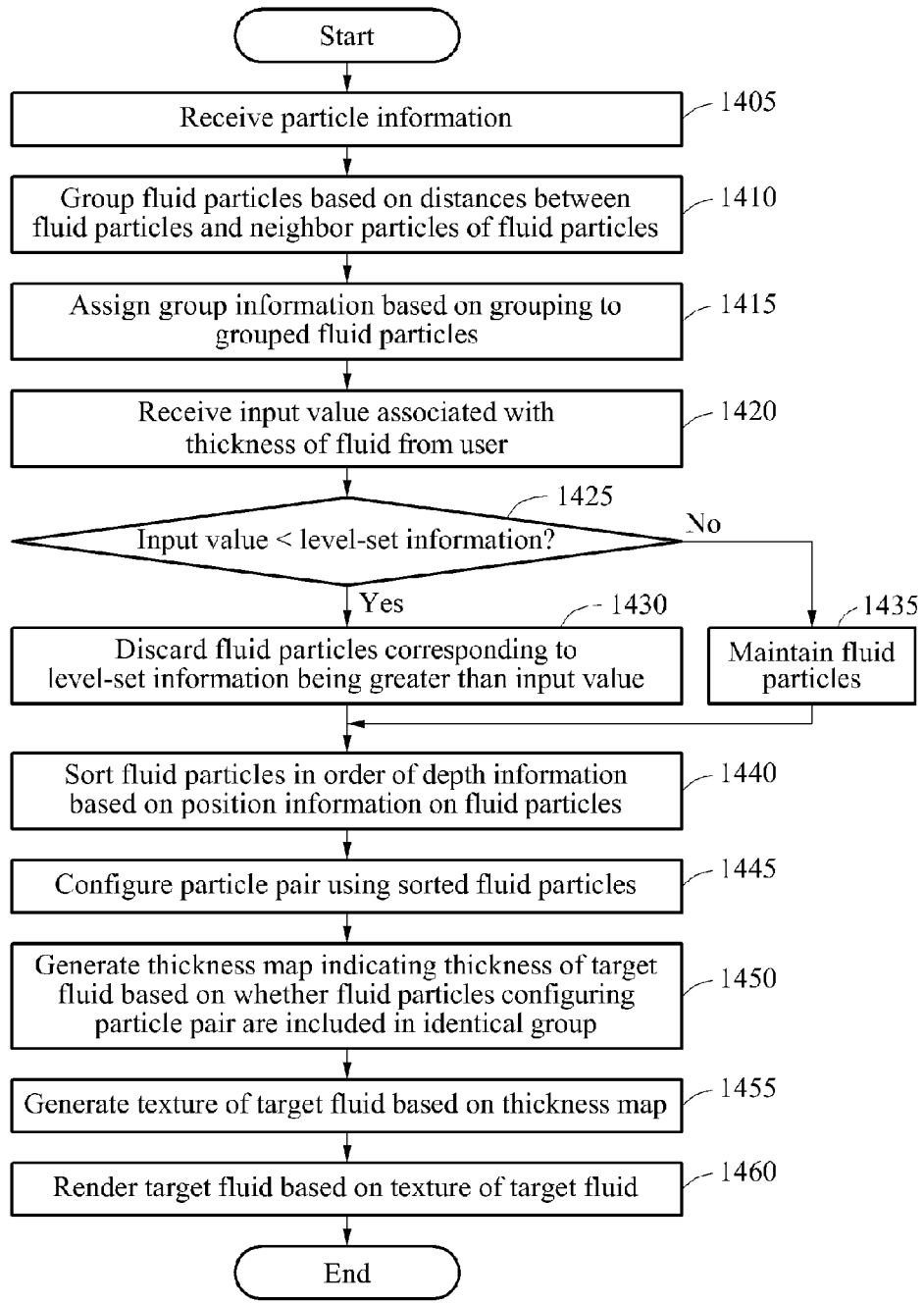
FIG. 14 is a flowchart illustrating another example of a method of rendering a target fluid, in accordance with an embodiment.

FIG. 14 is a flowchart illustrating another example of a method of rendering a target fluid, in accordance with an embodiment. Referring to FIG. 14, in operation 1405, a rendering apparatus receives particle information. For example, the particle information includes level-set information of fluid particles and information on neighbor particles of the fluid particles. In operation 1410, the rendering apparatus groups the fluid particles based on distances between the fluid particles and the neighbor particles of the fluid particles.

In operation 1415, the rendering apparatus assigns group information based on the grouping to the grouped fluid particles.

In operation 1420, the rendering apparatus receives an input value associated with a thickness of a fluid from a user.

In an embodiment, the rendering apparatus compares the input value to the level-set information. In operation 1425, the rendering apparatus verifies whether the level-set information is greater than the input value. Based on a result of a verification in operation 1425, in response to the level-set information being less than or equal to the input value, in operation 1435, the rendering apparatus maintains the fluid particles corresponding to the level-set information being less than or equal to the input value.

Based on the result of the verification in operation 1425, in response to the level-set information being greater than the input value, in operation 1430, the rendering apparatus discards, from the modeled target fluid, fluid particles corresponding to the level-set information being greater than the input value.

Subsequent to performing operation 1430 or operation 1435, in operation 1440, the rendering apparatus sorts the fluid particles in an order of depth information based on position information of fluid particles. The rendering apparatus generates a sorting table based on the depth information and the group information of fluid particles corresponding to the depth information.

In operation 1445, the rendering apparatus configures, defines, or produces a particle pair using the sorted fluid particles. In operation 1450, the rendering apparatus generates a thickness map indicating a thickness of the target fluid based on whether fluid particles configuring a particle pair are included in an identical group.

In operation 1455, the rendering apparatus generates a texture of the target fluid based on the thickness map. In operation 1460, the rendering apparatus renders the target fluid based on the texture of the target fluid.

FIG. 15 illustrates an example of a thickness map generated in accordance with an embodiment. FIG. 15 illustrates a thickness map finally generated by a rendering apparatus having accumulated a thickness of a particle and a depth difference among fluid particles configuring a particle pair.

The rendering apparatus generates a texture to which thickness information of a target fluid is reflected using accumulated thicknesses of the thickness map, even when internal particles of the target fluid are discarded. The rendering apparatus performs rendering of the target fluid based on the texture to which the thickness information of the target fluid is reflected.

FIG. 16 is a block diagram illustrating an example of an apparatus for rendering a target fluid, in accordance with an embodiment. Referring to FIG. 16, a rendering apparatus 1600 includes a processor 1610 and a memory 1620. The rendering apparatus 1600 further includes a receiver 1630. The processor 1610, the memory 1620, and the receiver 1630 may communicate with each other through a bus 1640. The processor 1610 defines level-set information of fluid particles configuring a modeled target fluid. The processor 1610 discards internal particles of the target fluid from the modeled target fluid based on the level-set information of the fluid particles. The processor 1610 renders the target fluid based on thickness information of the target fluid from which the internal particles are discarded, and the thickness information is calculated using the depth information on the fluid particles.

The memory 1620 stores at least one position information of the fluid particles, information on neighbor particles of the fluid particles, and the level-set information of the fluid particles.

The receiver 1630 receives an input value associated with a thickness of a fluid from a user. The processor 1610 discards, from the modeled target fluid, fluid particles corresponding to the level-set information being greater than the input value based on a result of a comparison between the input value and the level-set information.

The processor 1610 sorts the fluid particles in an order of the depth information based on the position information of the fluid particles. The processor 1610 configures a particle pair using the sorted fluid particles and generates a thickness map indicating a thickness of the target fluid from which the internal particles are discarded based on the thickness information of fluid particles configuring the particle pair.

The processor 1610 groups the fluid particles based on distances between the fluid particles and the neighbor particles of the fluid particles, and assigns group information based on the grouping to the grouped fluid particles.

The processor 1610 sorts the fluid particles in an order of the depth information based on the position information of the fluid particles and configures the particle pair using the sorted fluid particles. The processor 1610 generates the thickness map indicating the thickness of the target fluid based on whether the fluid particles configuring the particle pair are included in a same group or an identical group.

In accordance with an embodiment, although the processor 1610 illustrated and described with respect to FIG. 16 is shown as a single structural element, a person skilled in the relevant art would appreciate that, within the processor, sub-processors, generators, sorters, or controllers may be included to performed each of the functionality described above, such as the discarding, sorting, grouping, and generation of the thickness map.

The processor 1610 and, in the alternative, sub-processors, generators, sorters, or controllers, may also perform at least one of the aforementioned methods described with reference to FIGS. 1 through 15.

The processor 1610 executes a program and control a detecting apparatus. A program code executed by the processor 1610 may be stored in the memory 1620. The rendering apparatus 1600 may be connected to an external device, for example, a personal computer or a network, through an input and output device (not shown), and may exchange data.

The memory 1620 may be a volatile memory or a nonvolatile memory.

The rendering apparatus 1600 may include various types of electronic systems including, for example, a mobile device such as a mobile phone, a smartphone, a PDA, a tablet computer, a laptop computer and the like, a computing device such as a PC, the tablet computer, a netbook, and the like, and an electronic device such as a television, a smart television, a virtual reality providing apparatus, a game machine, and the like.

The apparatuses, processors, modules, devices, and other components illustrated in FIGS. 16 that perform the operations described herein with respect to FIGS. 2, 3, 5, 8, 9, 11, and 13 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 2, 3, 5, 8, 9, 11, and 13. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2, 3, 5, 8, 9, 11, and 13 that perform the operations described herein with respect to FIGS. 1, 4, 6-7, 10, 12 and 15-16 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of rendering a target fluid, comprising:
   defining level-set information of fluid particles configuring a modeled target fluid, wherein the level-set information comprises a shortest distance from a surface of the target fluid to the fluid particles;
   discarding internal particles of the target fluid from the modeled target fluid based on the level-set information of the fluid particles;
   calculating thickness information of the target fluid, from which the internal particles are discarded, based on depth information on the fluid particles; and
   rendering the target fluid based on the thickness information of the target fluid.

2. The method of claim 1, further comprising:
   receiving an input value associated with a thickness of a fluid from a user,
   wherein the discarding of the internal particles of the target fluid comprises discarding the internal particles of the target fluid based a comparison between the input value and the level-set information.

3. The method of claim 2, wherein the discarding of the internal particles of the target fluid comprises:
   discarding, from the modeled target fluid, fluid particles corresponding to the level-set information greater than the input value.

4. The method of claim 1, wherein the calculating of the thickness information of the target fluid comprises:
   calculating, at a point in time corresponding to a scene, the thickness information of the target fluid based on depth information on surface particles configuring the target fluid.

5. The method of claim 1, wherein the calculating of the thickness information of the target fluid comprises:
   sorting the fluid particles in an order of the depth information based on position information of the fluid particles;
   configuring a particle pair using the sorted fluid particles; and
   generating a thickness map indicating a thickness of the target fluid, from which the internal particles are discarded, based on thickness information of fluid particles configuring the particle pair.

6. The method of claim 5, wherein the sorting of the fluid particles comprises:
   calculating the depth information from a virtual camera based on the position information of the fluid particles;
   sorting the fluid particles based on the depth information; and
   generating a sorting table based on the depth information corresponding to the sorted fluid particles.

7. The method of claim 1, further comprising:
   receiving at least one of the position information of the fluid particles, information on neighbor particles of the fluid particles, and the level-set information of the fluid particles.

8. The method of claim 1, further comprising:
   grouping the fluid particles based on particle information of the fluid particles.

9. The method of claim 8, wherein the grouping of the fluid particles comprises:
   grouping the fluid particles based on distances between the fluid particles and neighbor particles of the fluid particles; and
   assigning group information based on the grouping to the grouped fluid particles.

10. The method of claim 9, wherein the grouping of the fluid particles comprises:
   calculating the distances between the fluid particles and the neighbor particles from information on the neighbor particles of the fluid particles comprised in the particle information; and grouping the fluid particles based on the distances between the fluid particles and the neighbor particles.

11. The method of claim 8, wherein the calculating of the thickness information of the target fluid from which the internal particles are discarded comprises:
sorting the fluid particles in an order of the depth information based on position information of the fluid particles; and
calculating the thickness information of the target fluid from which the internal particles are discarded based on group information corresponding to the sorted fluid particles.

12. The method of claim 11, wherein the sorting of the fluid particles comprises:
calculating the depth information from a virtual camera based on the position information of the fluid particles;
sorting the fluid particles based on the depth information; and
generating a sorting table based on the depth information corresponding to the sorted fluid particles and the group information of the fluid particles corresponding to the depth information.

13. The method of claim 11, wherein the calculating of the thickness information of the target fluid comprises:
configuring a particle pair using the sorted fluid particles; and
generating a thickness map indicating a thickness of the target fluid based on whether fluid particles configuring the particle pair are comprised in a same group.

14. The method of claim 13, wherein the generating of the thickness map comprises at least one of,
adding a depth difference among fluid particles configuring the particle pair to the thickness map in response to the fluid particles configuring the particle pair in the same group;
adding a thickness of a particle to the thickness map in response to the fluid particles configuring the particle pair excluded from the same group; and
discarding any one fluid particle not comprised in the same group from the particle pair in response to the fluid particles configuring the particle pair excluded from the same group.

15. A computer program embodied on a non-transitory computer readable medium, the computer program being configured to control a processor to perform the method of claim 1.

16. An apparatus for rendering a target fluid, comprising:
a memory configured to store at least one of position information of fluid particles, information on neighbor particles of the fluid particles, and level-set information of the fluid particles, wherein the level-set information comprises a shortest distance from a surface of a target fluid to the fluid particles; and
a processor configured to define the level-set information of the fluid particles configuring a modeled target fluid, discard internal particles of the target fluid from the modeled target fluid based on the level-set information of the fluid particles, and render the target fluid based on thickness information of the target fluid, wherein the internal particles are calculated based on depth information on the fluid particles.

17. The apparatus of claim 16, further comprising:
a receiver configured to receive an input value associated with a thickness of a fluid from a user,
wherein the processor is configured to discard, from the target fluid, fluid particles corresponding to level-set information greater than the input value based on a comparison between the input value and the level-set information.

18. The apparatus of claim 16, wherein the processor is configured to sort the fluid particles in an order of the depth information based on the position information of the fluid particles, configure a particle pair using the sorted fluid particles, and generate a thickness map indicating a thickness of the target fluid from which the internal particles are discarded based on thickness information of fluid particles configuring the particle pair.

19. The apparatus of claim 16, wherein the processor is configured to group the fluid particles based on distances between the fluid particles and neighbor particles of the fluid particles, and assign group information based on the grouping to the grouped fluid particles.

20. The apparatus of claim 19, wherein the processor is configured to sort the fluid particles in an order of the depth information based on the position information of the fluid particles, configure a particle pair using the sorted fluid particles, and generate a thickness map indicating a thickness of the target fluid based on whether fluid particles configuring the particle pair are in a same group.

21. A method of a target fluid, comprising:
calculating depth information from a virtual camera based on position information of fluid particles;
sorting the fluid particles in an order of the depth information based on the position information of the fluid particles;
configuring a particle pair using the sorted fluid particles;
discarding, from the particle pair, a fluid particle outside from a same group of the fluid particles;
adding to a thickness map a depth difference of the fluid particles in the particle pair in response to the particle pair being included in the same group; and
storing the thickness map indicating a thickness of the target fluid from which the fluid particle has been discarded.

22. The method of claim 21, further comprising:
generating a sorting table based on the depth information and group information of the fluid particles corresponding to the depth information.

23. The method of claim 22, further comprising:
determining level-set information of the fluid particles and information on neighbor particles of the fluid particles, wherein the level-set information comprises a shortest distance from a surface of the target fluid to the fluid particles; and
grouping the fluid particles based on distances between the fluid particles and the neighbor particles.

24. The method of claim 23, further comprising:
maintaining the fluid particles corresponding to the level-set information being less than or equal to a thickness value; and
discarding the fluid particles corresponding to the level-set information being greater than the thickness value.

25. The method of claim 21, further comprising:
generating a texture of the target fluid based on the thickness map; and
rendering the target fluid based on the texture of the target fluid.

* * * * *